United States Patent
Xu et al.

(10) Patent No.: US 9,699,844 B2
(45) Date of Patent: Jul. 4, 2017

(54) MULTICHANNEL CONSTANT CURRENT LED DRIVING CIRCUIT, DRIVING METHOD AND LED DRIVING POWER

(71) Applicant: Silergy Semiconductor Technology (Hangzhou) LTD, Hangzhou, ZheJiang Province (CN)

(72) Inventors: Ligang Xu, Hangzhou (CN); Jianxin Wang, Hangzhou (CN); Hongbin Lai, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/176,337

(22) Filed: Jun. 8, 2016

(65) Prior Publication Data

US 2016/0286614 A1    Sep. 29, 2016

Related U.S. Application Data

(63) Continuation of application No. 14/818,568, filed on Aug. 5, 2015, now Pat. No. 9,408,265.

(30) Foreign Application Priority Data

Aug. 7, 2014    (CN) .......................... 2014 1 0387791

(51) Int. Cl.
   H05B 33/08    (2006.01)
(52) U.S. Cl.
   CPC ....... *H05B 33/0815* (2013.01); *H05B 33/083* (2013.01); *H05B 33/0845* (2013.01); *H05B 33/0851* (2013.01); *Y02B 20/347* (2013.01)

(58) Field of Classification Search
   CPC ............ H05B 33/0809; H05B 33/0815; H05B 33/0827; H05B 33/083; H05B 33/0821; H05B 33/0842; H05B 33/0845; H05B 37/02
   USPC .... 315/291, 294, 307, 312, 224, 247, 185 R
   See application file for complete search history.

(56) References Cited

U.S. PATENT DOCUMENTS

| | | | |
|---|---|---|---|
| 7,615,974 B1 * | 11/2009 | Xu | ...................... H05B 33/0815 323/225 |
| 8,344,653 B2 | 1/2013 | Lee et al. | |
| 8,471,483 B2 | 6/2013 | Lee et al. | |
| 8,569,954 B2 | 10/2013 | Kang | |
| 8,653,749 B2 | 2/2014 | Hwang et al. | |
| 8,760,080 B2 * | 6/2014 | Yu | ...................... H02M 3/33561 315/192 |
| 8,841,862 B2 | 9/2014 | Lee | |

(Continued)

*Primary Examiner* — Haissa Philogene
(74) *Attorney, Agent, or Firm* — Michael C. Stephens, Jr.

(57) ABSTRACT

A multichannel constant current LED driving circuit can include: (i) a power stage circuit having a power switching transistor, an inductor, and a rectifier circuit, where the power stage circuit is configured to receive a DC bus voltage, and to generate a pseudo-constant output signal to drive a plurality of LED strings; (ii) a current control unit configured to control an average current of each of the plurality of LED strings in accordance with a corresponding one of a plurality of dimming signals; and (iii) the current control unit being configured to control the power switching transistor in accordance with a current feedback signal that represents a current flowing through the LED strings, where the plurality of LED strings are coupled in series to receive the pseudo-constant output signal.

20 Claims, 9 Drawing Sheets

(56) References Cited

U.S. PATENT DOCUMENTS

| | | | | |
|---|---|---|---|---|
| 8,872,438 B2* | 10/2014 | Zhou | .................. | H05B 33/0845 |
| | | | | 315/193 |
| 8,907,576 B2* | 12/2014 | Ferrier | ............... | H05B 33/0812 |
| | | | | 315/122 |
| 9,030,122 B2 | 5/2015 | Yan | | |
| 9,408,265 B2* | 8/2016 | Xu | .................... | H05B 33/0815 |
| 2013/0293154 A1* | 11/2013 | Kuang | ............... | H05B 33/0815 |
| | | | | 315/307 |
| 2015/0069989 A1* | 3/2015 | Yau | ...................... | H02M 3/156 |
| | | | | 323/282 |
| 2016/0044759 A1* | 2/2016 | Lai | .................... | H05B 33/0815 |
| | | | | 315/186 |

* cited by examiner

US 9,699,844 B2

MULTICHANNEL CONSTANT CURRENT LED DRIVING CIRCUIT, DRIVING METHOD AND LED DRIVING POWER

RELATED APPLICATIONS

This application is a continuation of the following application, U.S. patent application Ser. No. 14/818,568, filed on Aug. 5, 2015, and which is hereby incorporated by reference as if it is set forth in full in this specification, and which also claims the benefit of Chinese Patent Application No. 201410387791.8, filed on Aug. 7, 2014, which is incorporated herein by reference in its entirety.

FIELD OF THE INVENTION

The present disclosure generally relates to the field of power supply, and more specifically, to a multichannel constant current LED driving circuit, driving method and an LED driving power.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

SUMMARY

In one embodiment, a multichannel constant current LED driving circuit can include: (i) a power stage circuit having a power switching transistor, an inductor, and a rectifier circuit, where the power stage circuit is configured to receive a DC bus voltage, and to generate a pseudo-constant output signal to drive a plurality of LED strings; (ii) a current control unit configured to control an average current of each of the plurality of LED strings in accordance with a corresponding one of a plurality of dimming signals; and (iii) the current control unit being configured to control the power switching transistor in accordance with a current feedback signal that represents a current flowing through the LED strings, where the plurality of LED strings are coupled in series to receive the pseudo-constant output signal.

In one embodiment, a method of driving a plurality of LED strings can include: (i) receiving, in a plurality of LED strings coupled in series, an output current of an LED driving circuit; (ii) receiving a plurality of dimming signals that each corresponding to one of the plurality of LED strings; (iii) controlling an average current flowing through each of the plurality of LED strings in accordance with a corresponding of the plurality of dimming signals; (iv) receiving a current feedback signal that represents the output current flowing through the plurality of LED strings; and (v) controlling the output current to be pseudo-constant in accordance with the current feedback signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A light-emitting diode (LED) driving power employed for various LED backlight apparatuses may typically employ a plurality of outputs. Because the luminance of an LED light is determined by a current flowing through the LED light, the driving current must be maintained constant in order to obtain stable luminance. For multiple LED loads, the driving current of each LED load should accordingly be controlled to be constant. In some multichannel constant current LED driving circuits, each of the LED loads are configured to be driven by one corresponding constant driving circuit.

Figure 1:
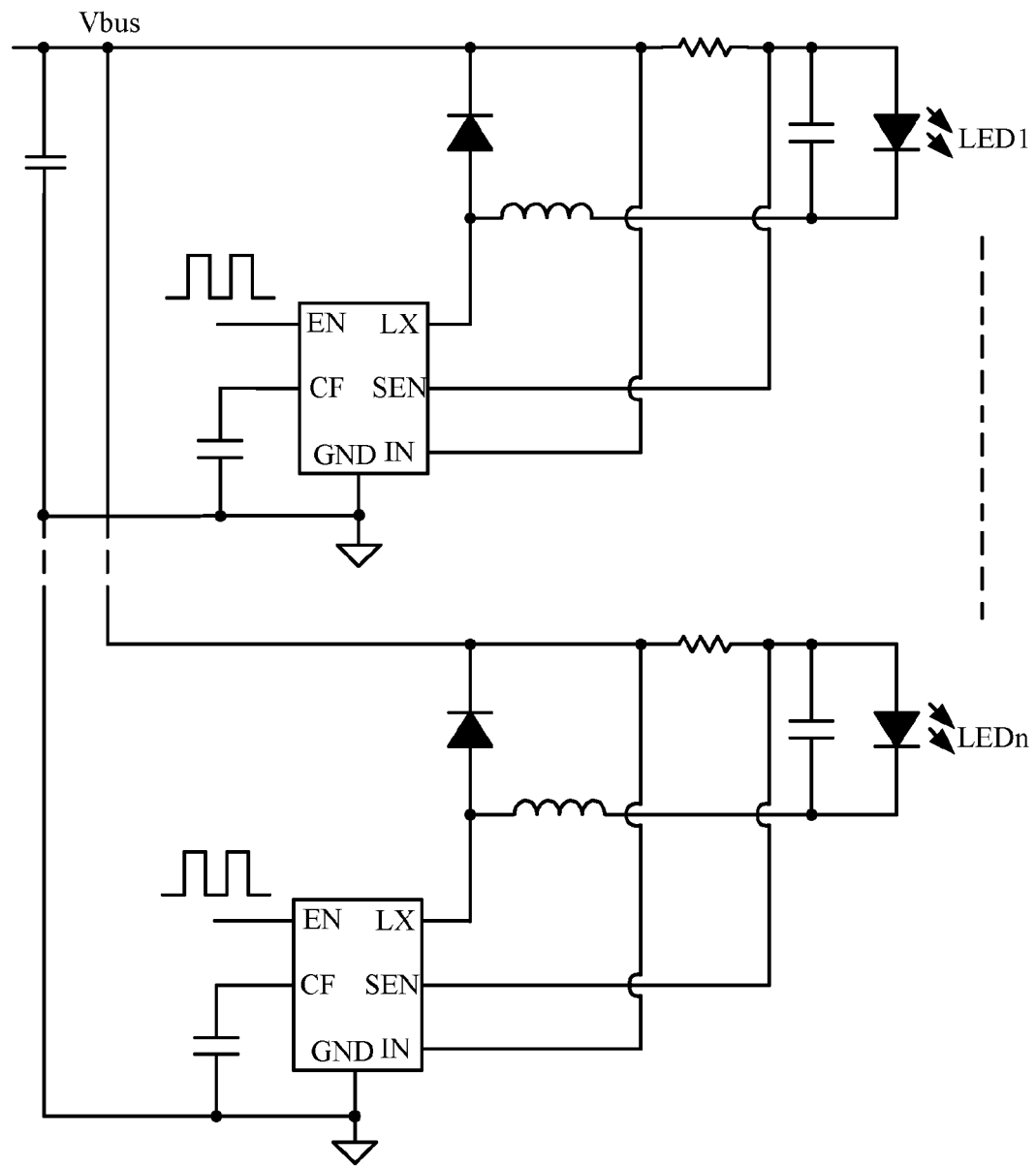
FIG. 1 is a schematic block diagram of a first example multichannel constant current LED driving circuit.

Referring now to FIG. 1, shown is a schematic block diagram of a first example multichannel constant current LED driving circuit. Each of the LED loads are configured to be driven by one corresponding pulse-width modulation (PWM) driving circuit. As a result, various multiple elements (e.g., inductors, diodes, resistors, etc.) may be utilized in such circuitry, which may increase the circuit volume and complexity.

Figure 2:
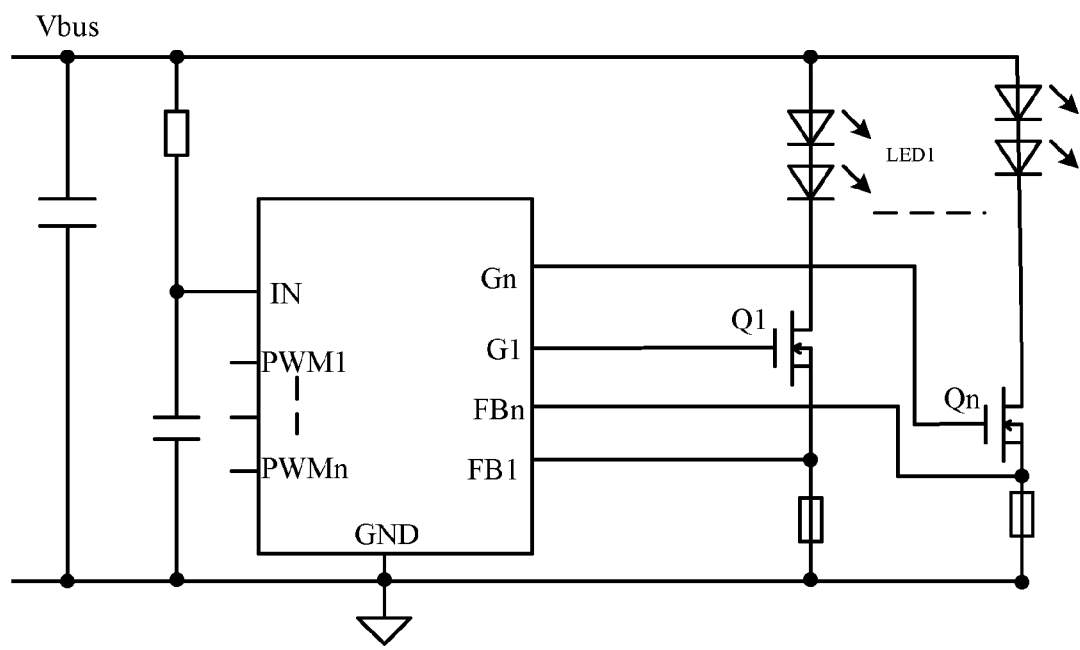
FIG. 2 is a schematic block diagram of a second example multichannel constant current LED driving circuit.

Referring now to FIG. 2, shown is a schematic block diagram of a second example multichannel constant current LED driving circuit. In this case, each of the LED loads may be driven by one corresponding linear regulation circuit. However, this approach may decrease the circuit conversion efficiency, which can limit the power provided.

In one embodiment, a multichannel constant current LED driving circuit can include: (i) a power stage circuit having a power switching transistor, an inductor, and a rectifier circuit, where the power stage circuit is configured to receive a DC bus voltage, and to generate a pseudo-constant output signal to drive a plurality of LED strings; (ii) a current control unit configured to control an average current of each of the plurality of LED strings in accordance with a corresponding one of a plurality of dimming signals; and (iii) the current control unit being configured to control the power switching transistor in accordance with a current feedback signal that represents a current flowing through the LED strings, where the plurality of LED strings are coupled in series to receive the pseudo-constant output signal.

Figure 3A:
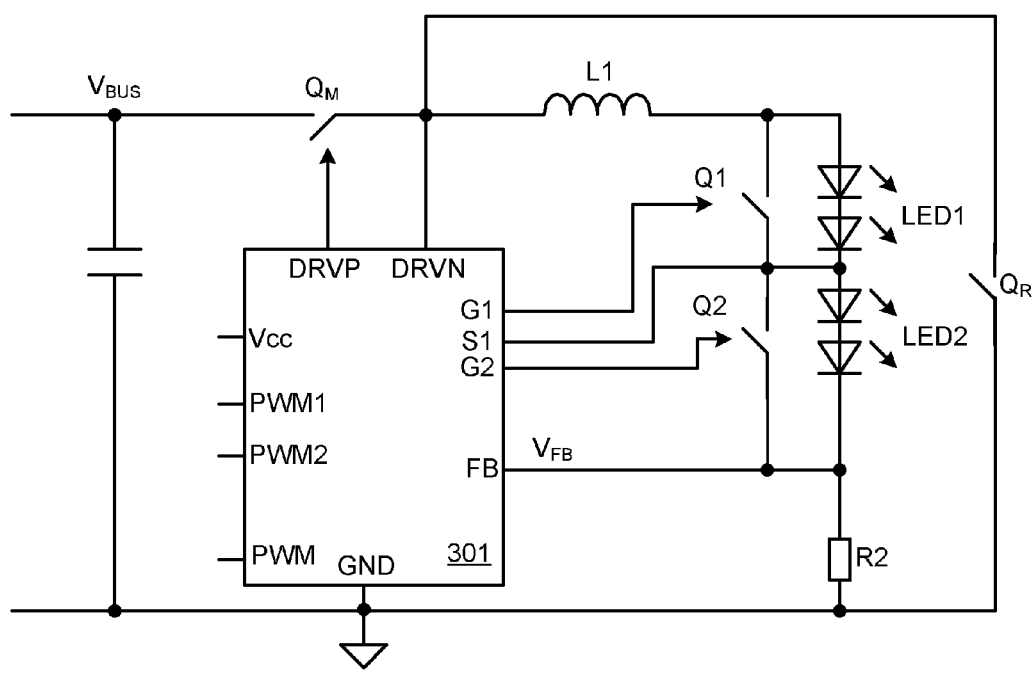
FIG. 3A is a schematic block diagram of a first example multichannel constant current LED driving circuit, in accordance with embodiments of the present invention.

Referring now to FIG. 3A, shown is a schematic block diagram of a first example multichannel constant current LED driving circuit, in accordance with embodiments of the present invention. This particular example shows an LED load with two LED strings (e.g., LED1 and LED2) coupled in series. This example multichannel constant current LED driving circuit can receive DC bus voltage $V_{BUS}$ in order to drive the LED load to be in a stable operation status, and may include a power stage circuit. The power stage circuit can include power switching transistor $Q_M$, inductor L1, and rectifier switching transistor $Q_R$ configured to form a buck converter topology. For example, power switching transistor $Q_M$ and inductor L1 may be connected in series between an input terminal of the DC bus voltage and the anode of the LED strings. Rectifier switching transistor $Q_R$ can connect between ground and a common node of power switching transistor $Q_M$ and inductor L1. In an alternative configuration, rectifier switching transistor $Q_R$ can connect to the cathode of the LED strings and a common node between the power switching transistor and inductor L1.

This example multichannel constant current LED driving circuit can also include current control unit 301 configured to control the switching status of power switching transistor $Q_M$ in accordance with current feedback signal $V_{FB}$. In this way, an output current of the power stage circuit can be controlled to be substantially constant, and the value of which can meet application requirements to drive the LED strings. Current control unit 301 can also control an average current of each of the LED strings in accordance with a corresponding dimming signal, in order to obtain corresponding luminance. For example, the dimming signals can be PWM dimming signals, or any other suitable control signals, that can be converted to duty cycle related signals. In this particular example, PWM1 dimming signal can control the luminance of LED string LED1, and PWM2 dimming signal can control the luminance of LED string LED2.

This example multichannel constant current LED driving circuit can also include a multichannel switching circuit having a plurality of switching transistors corresponding to the LED strings. For example, switching transistor Q1 connected in parallel with LED strings LED1 may form a first switching circuit, and switching transistor Q2 connected in parallel with LED string LED2 may form a second switching circuit. The control terminals of switching transistor Q1 and Q2 can connect to current control unit 301, and the switch states (e.g., off/on) of the switching transistors can be controlled by current control unit 301 in accordance with the PWM dimming signals. In this way, corresponding LED strings can periodically turned off/on by way of current control unit 301.

For example, current feedback signal $V_{FB}$ can be generated by a current sensing circuit that includes sensing resistor R2 connected between the cathode of the LED strings and ground. As shown, a voltage signal at the common node between the LED strings and sensing resistor R2 is configured as current feedback signal $V_{FB}$. As those skilled in the art will recognize, such current sensing can be implemented by other suitable circuitry.

Current control unit 301 can receive a PWM control signal that regulates the value of a reference current signal. The output current of the power stage circuit can be controlled by current control unit 301 in accordance with the reference current signal and current feedback signal $V_{FB}$. The reference current signal can be in direct proportion with an expected driving current of the LED strings. For different LED loads, the expected driving currents may be different, and therefore the output current of the power stage circuit can be correspondingly regulated. The output current can be regulated in accordance with an error between the reference current signal and current feedback signal $V_{FB}$.

Figure 3B:
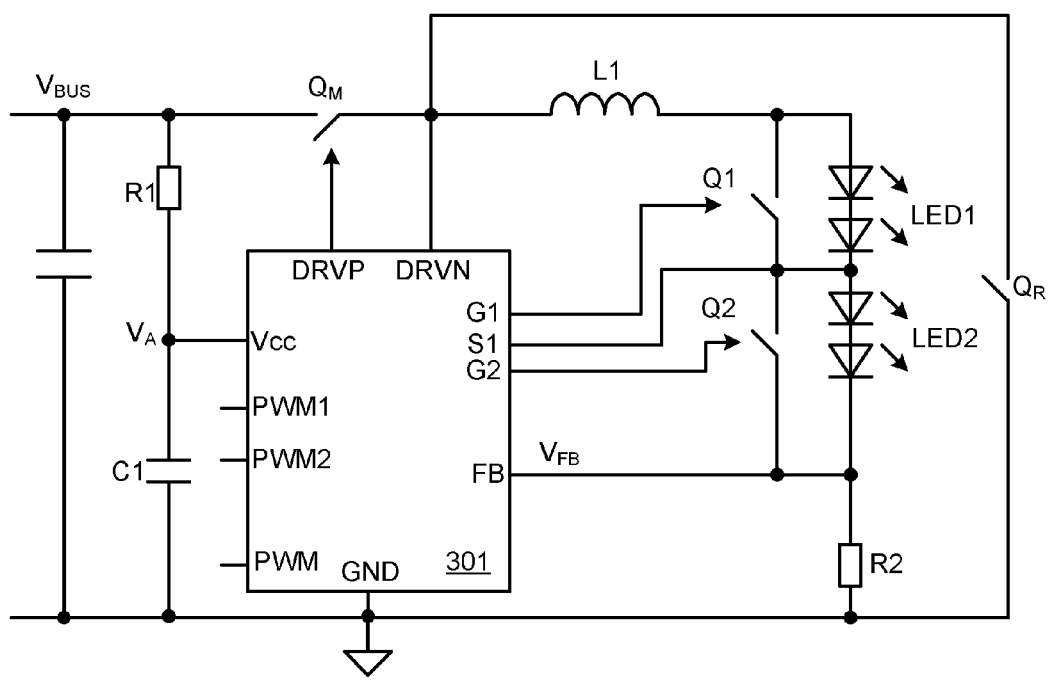
FIG. 3B is a schematic block diagram of an example power supply circuit of the multichannel constant current LED driving circuit of FIG. 3A, in accordance with embodiments of the present invention.

Referring now to FIG. 3B, shown is a schematic block diagram of an example power supply circuit of the multichannel constant current LED driving circuit of FIG. 3A, in accordance with embodiments of the present invention. In this particular example, the multichannel constant current LED driving circuit may also include a power supply circuit for supplying power to current control unit 301. The power supply circuit may include resistor R1 and capacitor C1. A first terminal of resistor R1 can connect to the input terminal of DC bus voltage $V_{BUS}$, a second terminal of resistor R1 can connect a first terminal of capacitor C1, and a second terminal of capacitor C1 can connect to ground. Voltage signal $V_A$ at the common node between resistor R1 and capacitor C1 may be configured as a supply voltage (e.g., at terminal Vcc) to current control unit 301. In an alternative implementation, resistor R1 can be omitted, and other alternatives can also be supported in certain embodiments.

LED strings LED1 and LED2 can connect in series to receive an output current of the power stage circuit. The reference current signal may be determined in accordance with the expected driving current of both LED strings LED1 and LED2. The status (e.g., on/off) of power switching transistor $Q_M$ can be controlled by current control unit 301 in accordance with current feedback signal $V_{FB}$ and the reference current signal, such that the output current of the power stage circuit is consistent with driving current requirements of LED strings LED1 and LED2. In accordance with certain requirements, such as warm-and-cold lamp applications, the luminance of LED strings LED1 and LED2 may be different. Also, the duty cycle of each PWM dimming signal can be regulated in accordance with associated luminance requirements. In addition, each of the switching transistors corresponding to the LED strings can be controlled by current control unit 301 in accordance with a corresponding PWM dimming signal. In this way, the average current of each LED string can be regulated to be consistent with the luminance requirements.

Figure 3C:
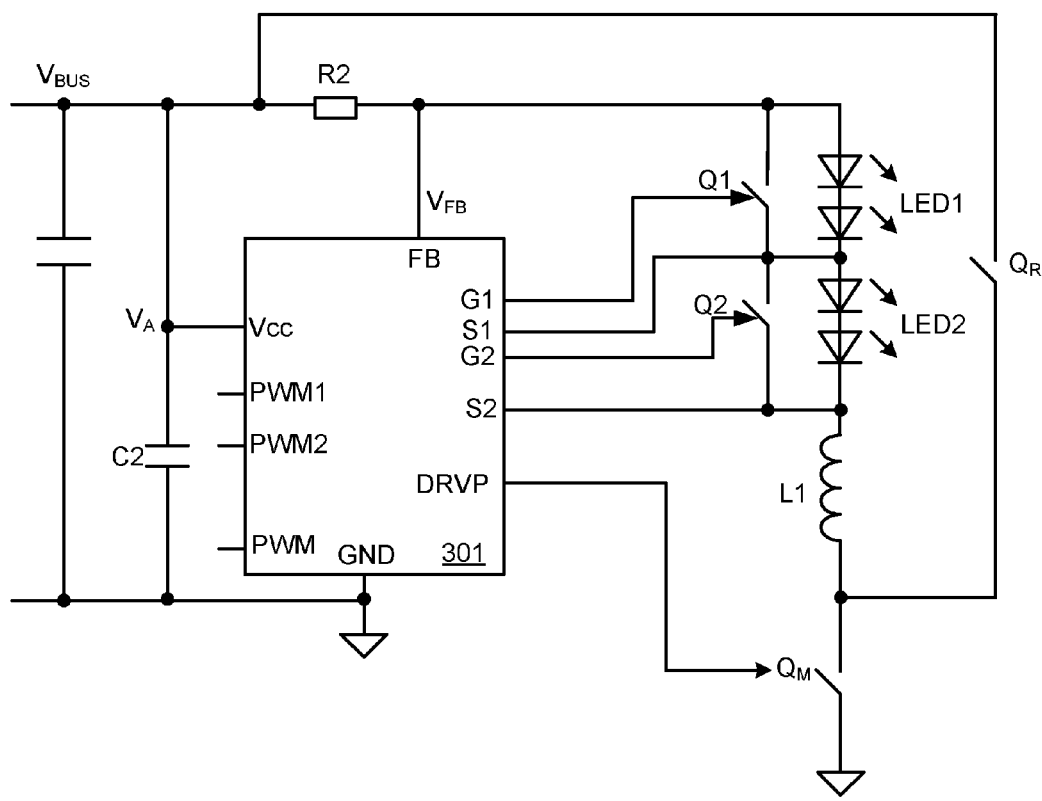
FIG. 3C is a schematic block diagram of a second example multichannel constant current LED driving circuit, in accordance with embodiments of the present invention.
Figure 3D:
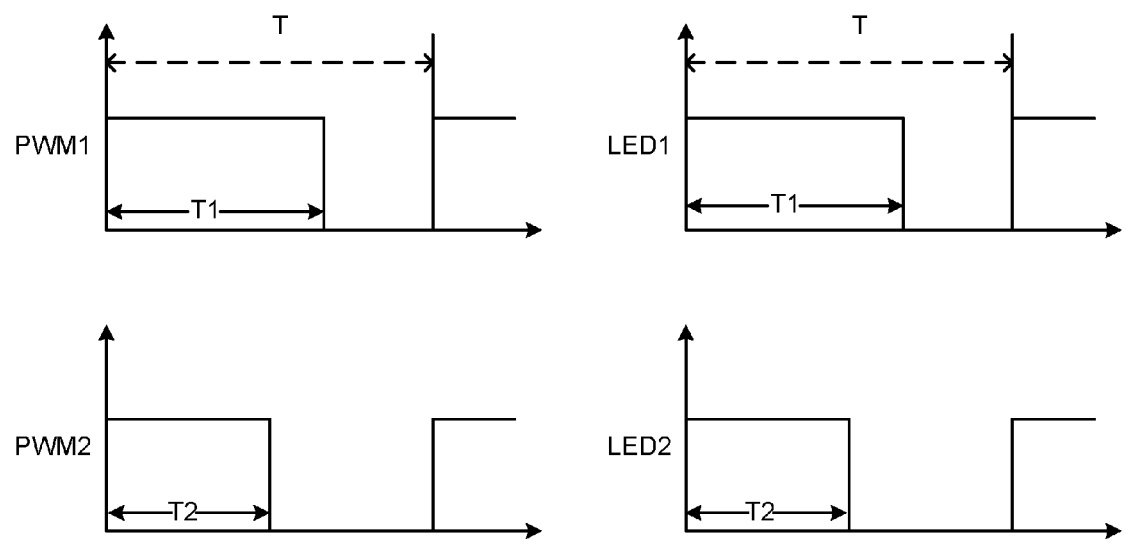
FIG. 3D is a waveform diagram showing example operation of the multichannel constant current LED driving circuit shown in FIG. 3A, in accordance with embodiments of the present invention.

Referring now to FIG. 3D, shown is a waveform diagram showing example operation of the multichannel constant current LED driving circuit shown in FIG. 3A, in accordance with embodiments of the present invention. In one switching period T, the output current can flow through LED string LED1 in time interval T1, during which PWM dimming signal PWM1 is active, and the output current may flow through LED string LED2 in time interval T2, during which PWM dimming signal PWM2 is active. Therefore, the luminance of LED strings LED1 and LED2 can be regulated to be different in view that the average current of LED strings LED1 and LED2 is different in order to achieve color and/or dimming control. In this fashion, the luminance of a cold-and-warm lamp that includes two LED strings can be regulated.

In particular embodiments, only one driving circuit may be utilized in driving a plurality of LED strings that are connected in series. For example, the driving circuit can include a buck configuration with power switching transistor $Q_M$, inductor L1, and the rectifier diode. The luminance of each of the LED strings may be controlled by a corresponding PWM dimming signal in order to meet different luminance requirements. Further, both constant driving current to drive the LED strings, and luminance regulation can be achieved in certain embodiments with a simplified circuit structure, fewer elements, and lower costs/volume, as compared to other approaches.

Referring now to FIG. 3C, shown is a schematic block diagram of a second example multichannel constant current LED driving circuit, in accordance with embodiments of the present invention. In this particular example, the power stage circuit can include power switching transistor $Q_M$, inductor L1, and a rectifier device (e.g., rectifier switching transistor $Q_R$) configured to form a buck topology circuit structure. Inductor L1 and power switching transistor $Q_M$ can connect in series between the cathode of the LED strings and ground, and rectifier switching transistor $Q_R$ can connect between DC bus voltage $V_{BUS}$ and a common node of power switching transistor $Q_M$ and inductor L1.

In this case, the current sensing circuit can include sensing resistor R2 connected between DC bus voltage $V_{BUS}$ and the anode of the LED strings. Also, a voltage signal at the common node between the current sensing circuit and the LED strings can be configured as current feedback signal $V_{FB}$. One terminal of rectifier switching transistor $Q_R$ can connect to the common node between power switching transistor $Q_M$ and inductor L1, and the other terminal can connect to the common node between sensing resistor R2 and the anode of the LED strings. The power supply circuit can include capacitor C2 connected between DC bus voltage $V_{BUS}$ and ground, and voltage $V_A$ across capacitor C2 may be configured as a supply voltage (e.g., at terminal Vcc) for current control unit 301. Example operation of this particular configuration can be as FIG. 3, and only one power stage circuit may be utilized in order to drive the LED strings to achieve constant driving current and luminance regulation.

Figure 4A:
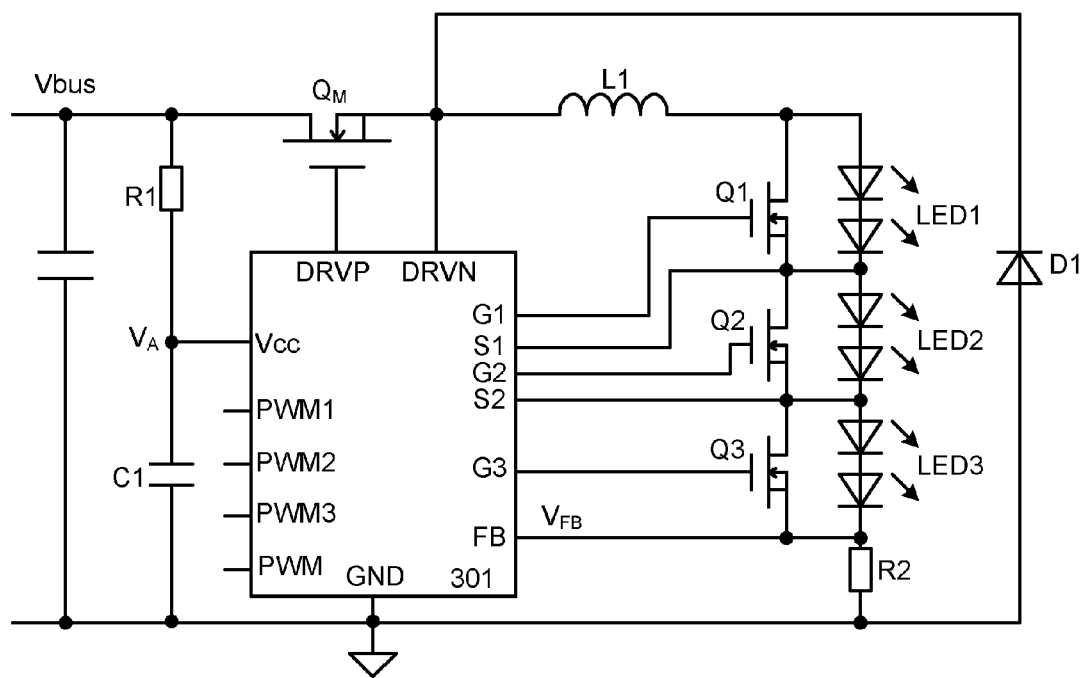
FIG. 4A is a schematic block diagram of a third example multichannel constant current LED driving circuit, in accordance with embodiments of the present invention.

Referring now to FIG. 4A, shown is a schematic block diagram of a third example multichannel constant current LED driving circuit, in accordance with embodiments of the present invention. In this particular example, the LED load can include three LED strings connected in series. Power switching transistor $Q_M$, inductor L1, and rectifier diode D1 may form a buck power stage circuit. This example multichannel constant current driving circuit can include a multichannel switching circuit with transistors Q1, Q2, and Q3. Transistor Q1 can be configured as a first switching circuit connected in parallel with LED string LED1, transistor Q2 can be configured as a second switching circuit connected in parallel with LED string LED2, and transistor Q3 can be configured as a third switching circuit connected in parallel with LED string LED3. The gates of transistors Q1, Q2, and Q3 may also be connected to current control unit 301 such that transistors Q1, Q2, and Q3 are controlled by current control unit 301 in accordance with PWM dimming signals PWM1, PWM2, and PWM3. In this way, an LED string can be controlled by a corresponding PWM dimming signal in order to obtain corresponding luminance regulation.

Figure 4B:
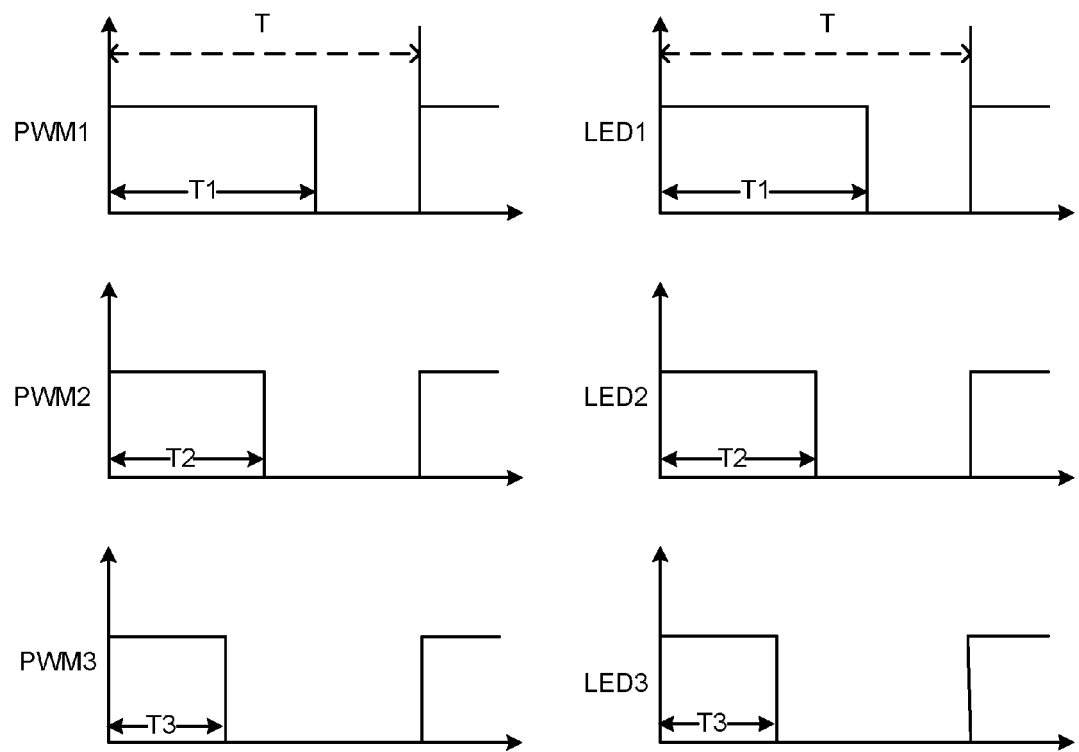
FIG. 4B is a waveform diagram showing example operation of the multichannel constant current LED driving circuit of FIG. 4A.

Referring now to FIG. 4B, shown is a waveform diagram showing example operation of the multichannel constant current LED driving circuit of FIG. 4A. In each switching period T, the output current may flow through LED string LED1 in time interval T1, during which PWM dimming signal PWM1 is active, the output current may flow through LED string LED2 in time interval T2, during which PWM dimming signal PWM2 is active, and the output current may flow through LED string LED3 in time interval T3, during which PWM dimming signal PWM3 is active. The luminance of LED strings LED1, LED2 and LED3 can be regulated to be different in view that the average current of LED strings LED1, LED2 and LED3 is different, to achieve color and/or dimming control. In this way, the luminance of a cold-and-warm lamp including three LED strings can be regulated.

Current control unit 301 can receive a PWM control signal to regulate the value of a reference current signal. An output current of the power stage circuit may be controlled by current control unit 301 in accordance with the reference current signal and current feedback signal $V_{FB}$. In this way, the output current of the power stage circuit can meet driving current requirements for different LED strings. While current control operation for LED loads including two and three LED strings have been shown and described above, those skilled in the art will recognize that a multichannel constant current driving circuit in particular embodiments can also be utilized to drive any number (e.g., 4, 5, etc.) of LED strings in order to achieve luminance regulation.

In one embodiment, a method of driving a plurality of LED strings can include: (i) receiving, in a plurality of LED strings coupled in series, an output current of an LED driving circuit; (ii) receiving a plurality of dimming signals that each corresponding to one of the plurality of LED strings; (iii) controlling an average current flowing through each of the plurality of LED strings in accordance with a corresponding of the plurality of dimming signals; (iv) receiving a current feedback signal that represents the output current flowing through the plurality of LED strings; and (v) controlling the output current to be pseudo-constant in accordance with the current feedback signal.

Particular embodiments may also include a multichannel constant current LED driving method for driving a plurality of LED strings. The method can include controlling the status of a power switching transistor in accordance with a current feedback signal (e.g., $V_{FB}$) of the LED strings (e.g., LED1, LED2, etc.) such that the power stage circuit generates a substantially constant output current to drive the LED strings. The method can also include controlling an average current of each of the LED strings in accordance with a corresponding PWM dimming signal in order to achieve corresponding luminance regulation. The generation of the output current can also include regulating a value of a reference current signal in direct proportion with an expected driving current of the LED strings based on a PWM control signal, and controlling the status (e.g., on/off) of the power switching transistor in accordance with the reference current signal and the current feedback signal, in order to control the output current of the power stage circuit.

Figure 5:
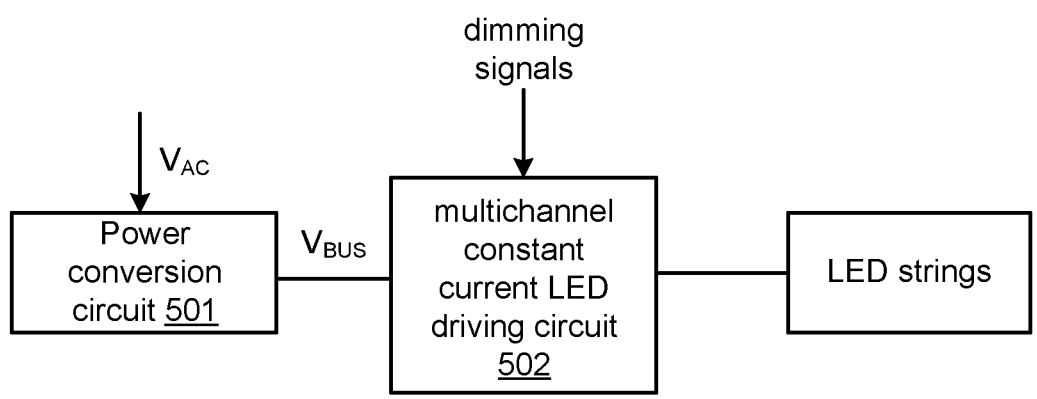
FIG. 5 is a schematic block diagram of an example LED driving circuit, in accordance with embodiments of the present invention.

Referring now to FIG. 5, shown is a schematic block diagram of an example LED driving circuit, in accordance with embodiments of the present invention. This particular example LED driving circuit can include power conversion circuit 501 and multichannel constant current LED driving circuit 502 (e.g., any of the above example driving circuits). Power conversion circuit 501 can receive external supply voltage $V_{AC}$, and may generate DC bus voltage $V_{BUS}$. Multichannel constant current LED driving circuit 502 can receive DC bus voltage $V_{BUS}$ and a plurality of PWM dimming signals, and may provide substantially or "pseudo" constant driving current to LED strings, as well as luminance regulation.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A light-emitting diode (LED) driving circuit configured to drive an LED load having a plurality of LED strings coupled in series, the LED driving circuit comprising:
   a) a power stage circuit configured to receive a DC bus voltage, and to generate an output signal to drive said plurality of LED strings;
   b) a current control unit configured to control an average current of each of said plurality of LED strings in accordance with a corresponding one of a plurality of dimming signals; and
   c) said current control unit being configured to control operation of said power stage circuit to control said output signal in accordance with a current feedback signal that represents a current flowing through said plurality of LED strings.

2. The LED driving circuit of claim 1, wherein each of said plurality of dimming signals comprises a pulse-width modulation (PWM) control signal.

3. The LED driving circuit of claim 1, further comprising a plurality of switching circuits, wherein each of said plurality of switching circuits is coupled in parallel to a corresponding one of said plurality of LED strings, and wherein each of said plurality of switching circuits is controlled to be on or off by said current control unit in accordance with a corresponding one of said plurality of dimming signals.

4. The LED driving circuit of claim 3, wherein each of said plurality of switching circuits is controlled to be on in a transistor saturation region.

5. The LED driving circuit of claim 3, wherein each of said plurality of LED strings has a same number of LEDs.

6. The LED driving circuit of claim 3, wherein:
   a) said switching circuit comprises a switching transistor having a first power terminal coupled to one terminal of said LED string, a second power terminal coupled to the other terminal of said LED string, and a control terminal coupled to said current control unit; and
   b) on and off operation of said switching transistor is controlled by a corresponding one of said plurality of dimming signals.

7. The LED driving circuit of claim 1, wherein said plurality of LED strings are coupled in series between outputs of said power stage circuit.

8. The LED driving circuit of claim 1, wherein said current control unit is configured to control said power switching transistor in accordance with an error between said current feedback signal and a reference current signal.

9. The LED driving circuit of claim 3, wherein each of said plurality of switching circuits comprises a controllable switch configured to be operated in a switching mode.

10. The LED driving circuit of claim 1, further comprising a current sensing circuit coupled in series with said plurality of LED strings, and being configured to generate said current feedback signal.

11. The LED driving circuit of claim 1, wherein said DC bus voltage is configured as a supply voltage of said current control unit.

12. The LED driving circuit of claim 8, wherein said reference current signal is regulated in accordance with a pulse-width modulation (PWM) control signal that represents a luminance requirement of said LED load.

13. The LED driving circuit of claim 10, wherein:
   a) said power stage circuit comprises a power switching transistor, an inductor, and a rectifier circuit; and
   b) said current sensing circuit, said plurality of LED strings, said inductor, and said power switching transistor are coupled in series between said DC bus voltage and ground.

14. The LED driving circuit of claim 13, wherein said inductor operates in a continuous current mode.

15. A method of driving a plurality of light-emitting diode (LED) strings, the method comprising:
   a) receiving a plurality of dimming signals that each corresponding to one of said plurality of LED strings;
   b) controlling, by a current control unit, an average current flowing through each of said plurality of LED strings in accordance with a corresponding one of said plurality of dimming signals;
   c) receiving a current feedback signal that represents an output current flowing through said plurality of LED strings; and
   d) controlling, by a power stage circuit configured to receive a DC bus voltage, said output current to be pseudo-constant in accordance with said current feedback signal.

16. The method of claim 15, further comprising determining said current feedback signal, by a current sensing circuit coupled in series with said plurality of LED strings, wherein a voltage signal across said current sensing circuit is configured as said current feedback signal.

17. The method of claim 15, further comprising controlling said plurality of LED strings by a plurality of switching circuits that are controlled to be on or off by a corresponding one of said plurality of dimming signals.

18. The method of claim 15, wherein each of said plurality dimming signals comprises a pulse-width modulation (PWM) control signal.

19. The method of claim 15, further comprising:
   a) determining a value of a reference current signal in accordance with a PWM control signal; and
   b) controlling said power stage circuit in accordance with an error between said reference current signal and said current feedback signal.

20. An apparatus, comprising:
   a) means for receiving a plurality of dimming signals that each corresponding to one of a plurality of light-emitting diode (LED) strings;
   b) means for controlling, by a current control unit, an average current flowing through each of said plurality of LED strings in accordance with a corresponding of said plurality of dimming signals;
   c) means for receiving a current feedback signal that represents an output current flowing through said plurality of LED strings; and d) means for controlling, by a power stage circuit configured to receive a DC bus voltage, said output current to be pseudo-constant in accordance with said current feedback signal.

\* \* \* \* \*